(12) United States Patent
Barel et al.

(10) Patent No.: US 10,386,948 B2
(45) Date of Patent: Aug. 20, 2019

(54) METHOD FOR TOUCH DETECTION ENHANCEMENT BASED ON IDENTIFYING A COVER FILM ON A TOUCH-SCREEN

(71) Applicant: Microsoft Technology Licensing, LLC, Redmond, WA (US)

(72) Inventors: Eliyahu Barel, Rosh HaAyin (IL); Michael Orlovsky, Hod-HaSharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 15/647,346

(22) Filed: Jul. 12, 2017

(65) Prior Publication Data

US 2019/0018527 A1  Jan. 17, 2019

(51) Int. Cl.
*G06F 3/041* (2006.01)
*G06F 3/044* (2006.01)
*G06F 3/0354* (2013.01)

(52) U.S. Cl.
CPC ............ *G06F 3/0412* (2013.01); *G06F 3/044* (2013.01); *G06F 3/0418* (2013.01); *G06F 3/03545* (2013.01)

(58) Field of Classification Search
USPC ........................................................ 345/174
See application file for complete search history.

(56) References Cited

U.S. PATENT DOCUMENTS

| 5,650,597 A | 7/1997 | Redmayne |
| 7,345,680 B2 | 3/2008 | David |
| 7,746,325 B2 | 6/2010 | Roberts |
| 8,502,800 B1 | 8/2013 | Vier |
| 8,753,571 B2 | 6/2014 | Hsu et al. |
| 8,773,366 B2 | 7/2014 | Hable et al. |

(Continued)

FOREIGN PATENT DOCUMENTS

| CN | 203666036 | 6/2014 |
| EP | 2843514 | 3/2015 |

(Continued)

OTHER PUBLICATIONS

Kim et al. "Compensation Algorithm for Misrecognition Caused by Hard Pressure Touch in Plastic Cover Capacity Touch Screen Panel", Journal of Display Technology, 12(12): 1623-1628, Oct. 6, 2016.

(Continued)

*Primary Examiner* — Jennifer Mehmood
*Assistant Examiner* — Deeprose Subedi

(57) ABSTRACT

A first set of classifier data and a different second set of classifier data are stored. Each of the first set and the second set is configured to differentiate between different types of touches on a touch sensitive screen including a capacitive based sensor. The first set is adapted to differentiate between different types of touches on a touch sensitive screen with no cover film added on the screen and the second set is adapted to differentiate between different types of touches when a cover film is added to the screen. The cover film is identified on the screen based on output from at least one conductive line or at least one array of conductive electrodes of the capacitive based sensor. The second set of classifier data is selected based on the identifying. A touch interaction is reported based on the second set of classifier data.

19 Claims, 15 Drawing Sheets

(56) References Cited

U.S. PATENT DOCUMENTS

| | | |
|---|---|---|
| 9,110,550 B2 | 8/2015 | Simmons et al. |
| 9,164,608 B2 | 10/2015 | Kim |
| 2010/0315348 A1 | 12/2010 | Jellicoe et al. |
| 2011/0057899 A1 | 3/2011 | Sleeman et al. |
| 2012/0268411 A1 | 10/2012 | Chen et al. |
| 2013/0106710 A1 | 5/2013 | Ashbrook |
| 2013/0147752 A1 | 6/2013 | Simmons et al. |
| 2013/0181935 A1* | 7/2013 | Mckenzie ............... G06F 3/044 345/174 |
| 2014/0232691 A1 | 8/2014 | Lee |
| 2015/0242009 A1 | 8/2015 | Xiao et al. |
| 2015/0261378 A1* | 9/2015 | Lee ....................... G06F 3/0416 715/765 |
| 2016/0202839 A1 | 7/2016 | Hwang |
| 2016/0216794 A1 | 7/2016 | Yoon et al. |
| 2017/0123532 A1* | 5/2017 | Zhao ....................... G06F 3/044 |

FOREIGN PATENT DOCUMENTS

| | | |
|---|---|---|
| KR | 10-2016-0077884 | 7/2016 |
| WO | WO 2014/180444 | 11/2014 |
| WO | WO 2015/119309 | 8/2015 |

OTHER PUBLICATIONS

Talal "How to Improve Touchscreen Sensitivity on Android Smartphones", Benign Blog—Educating World, 17 P., Mar. 2016.
"International Search Report and Written Opinion Issued in PCT Application No. PCT/US2018/034796", dated Aug. 14, 2018, 11 Pages.

* cited by examiner

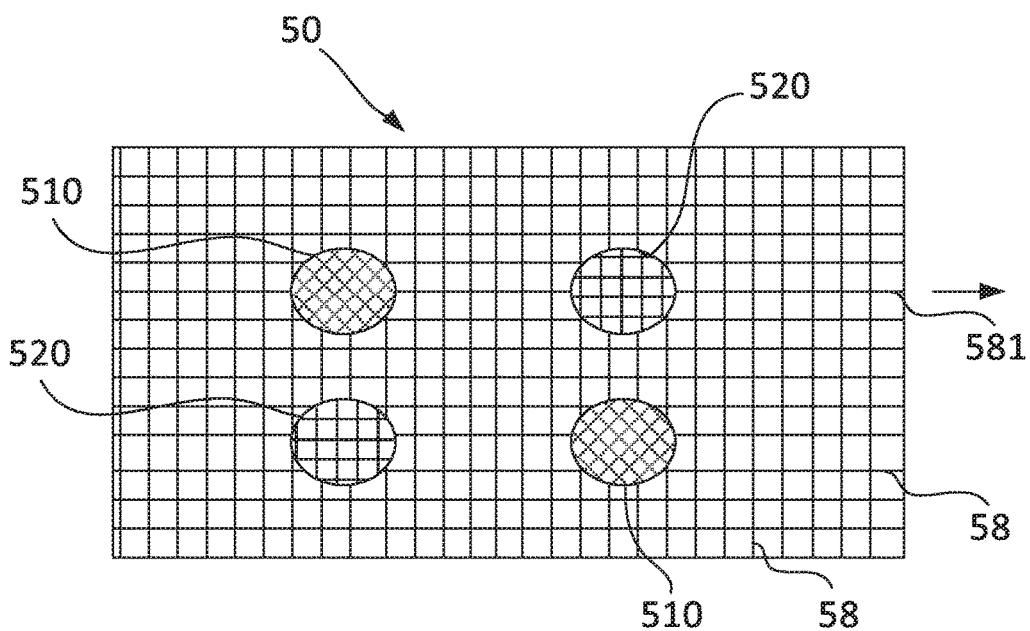
FIG. 10A
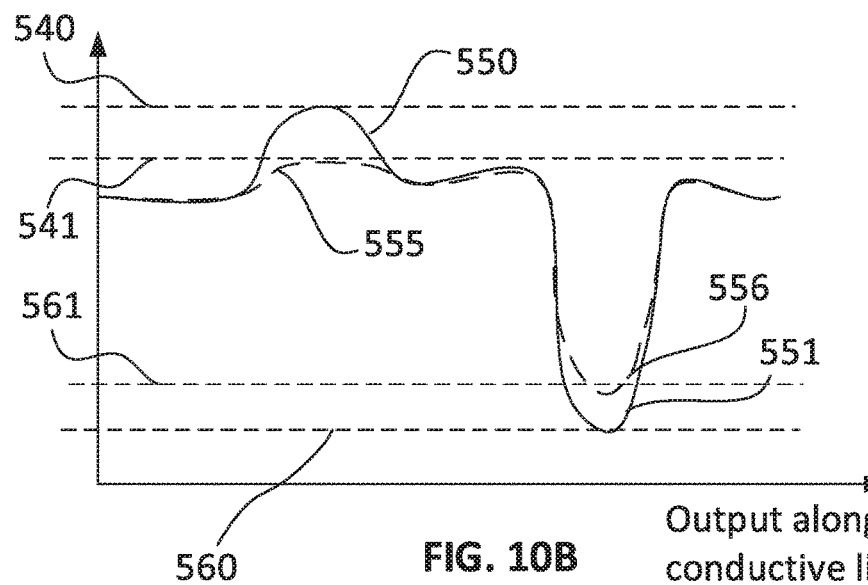
FIG. 10B Output along conductive line 581

US 10,386,948 B2

METHOD FOR TOUCH DETECTION ENHANCEMENT BASED ON IDENTIFYING A COVER FILM ON A TOUCH-SCREEN

FIELD AND BACKGROUND OF THE INVENTION

Digitizer systems are used as input devices for a variety of Human Interface Devices (HIDs) and for a variety of different applications. A touch-screen is one type of digitizer system that is integrated with a Flat Panel Display (FPD). Touch-screens are used for operating portable devices, such as laptop computers, tablet computers, MP3 players, smart phones and other devices.

Digitizer systems track free style input provided with a finger and/or stylus. A digitizer system typically includes a digitizer sensor such as a grid based capacitive sensor and a circuit to operate the sensor. A grid based capacitive sensor may be operated by the circuit for mutual capacitive or self-capacitive detection and may also be picked up on grid lines of the sensor and tracked. The circuit may determine coordinates of the finger and/or stylus based on output detected and report the coordinates to a processor of an HID.

It is known for a user to apply a cover film such as a protective film or privacy film over a display surface of a touch-screen and to provide the free-style input over the cover film. Protective films are typically applied to protect the display surface against scratches, dust and glare from sun or bright light. Privacy films are typically applied to prevent others from stealing sideways glances at content on the display. Cover films such as protective films and privacy films applied on touch-screens may range in thickness as well as material based on their intended function as well as the size of the display on which they are applied.

SUMMARY OF THE INVENTION

It has been found that while operating a touch-sensitive surface with a cover film, performance of the digitizer system may be degraded. According to some aspects of the present embodiments, one source of the degradation due to the presence of a cover film is smearing of a capacitive touch input or relative touch effect over a larger area. As used herein, the term relative touch effect refers to the change in amplitude of the measured signal due to the finger touch. Typically, touch input produces a peak in the output detected. The smearing may also be accompanied by a reduction in slope of the peak detected from the touch input. Degradation due to smearing may reduce resolution of touch detection and lead to improper classification of the touch input. In some examples, the smearing may lead to mistakenly identifying simultaneous touches that are distinct as a single touch or as palm input. The smearing may also lead to mistakenly identifying input by a pointer finger as input provided by a thumb. Another source of degradation due to the cover film may be attenuation of the touch signal. Attenuation may lead to reduced sensitivity of the touch-screen. Degradation due to attenuation may be small as compared to degradation due to the smearing.

According to some implementations there is provided a method for identifying presence of a cover film on a touch-screen, identifying an effective thickness of the cover film and then selecting a set of classifiers suitable for touch detection with the identified cover film. The effective thickness of the cover film may be the actual thickness of the cover film or may be a parameter that represents a level of degradation of the touch signal due to overall physical properties of the cover film, e.g. material of the cover film and thickness of the cover film. In some example implementations, the classifiers classify input based on at least one of shape, size, orientation of a touch imprint and slope of a peak due to touch. Optionally, a threshold applied for identifying touch input may also be selected based on an expected attenuation of the touch signal due to the presence of the cover film.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIGS. 10A and 10B are a graphical representation of multi-touch with ghosting and exemplary amplitudes from a corresponding heatmap;

DESCRIPTION OF SPECIFIC EMBODIMENTS OF THE INVENTION

Figure 1:
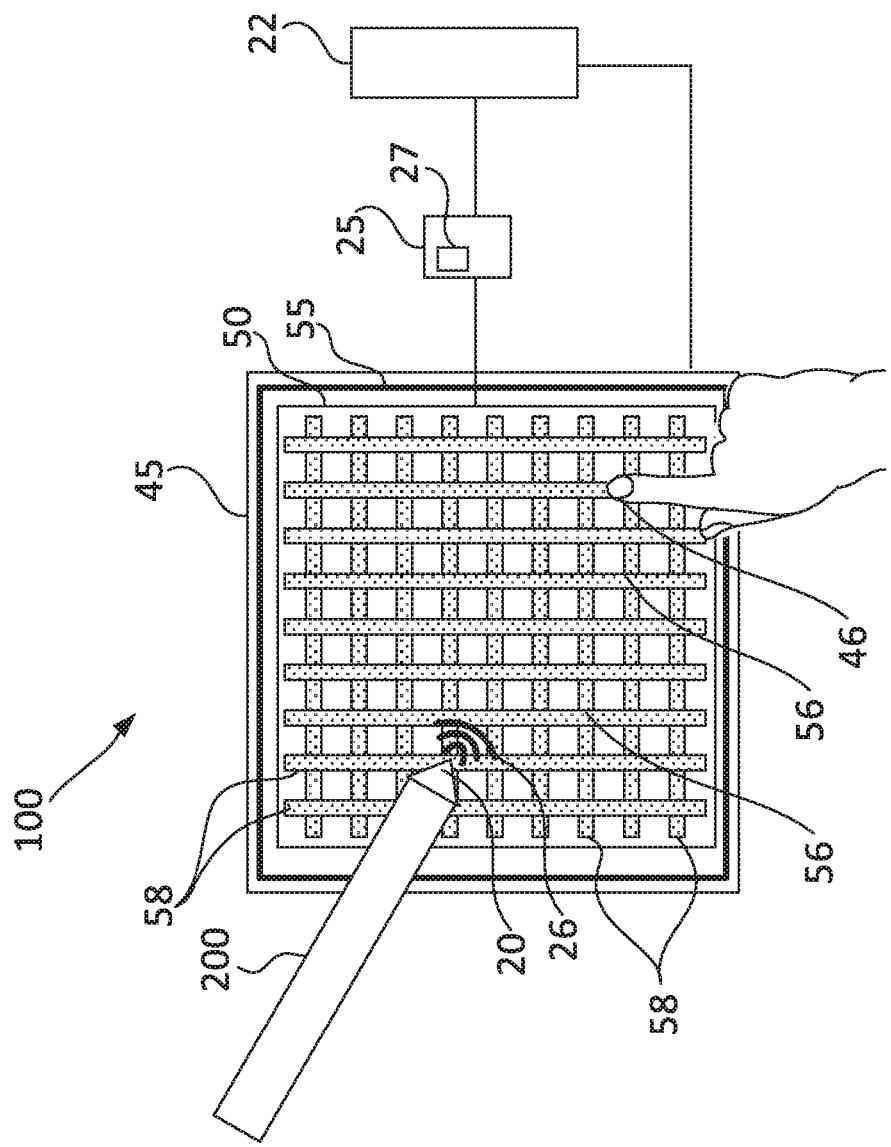
FIG. 1 is a simplified block diagram of an example computing device including a touch-screen for tracking stylus and finger input.

A digitizer system may be tuned and tested for optimized performance. The tuning and testing is typically performed with no cover film placed on the touch-screen. Based on the tuning, a classifier may be defined for each of a plurality of different touch types, e.g. standard finger size, large finger, bunch of fingers, palm and other unintended touch patterns to identify which touch object belongs to which class. The defined classifiers may use geometrical features that may be stored in a database containing statistical information regarding the features. The geometrical features may be used to classify a touch object as one of a plurality of pre-defined types of touches, e.g. palm, bunch of fingers, single finger.

According to some example implementations, it has been found that the classifiers may be sensitive to the presence of a cover film as well as physical properties of the cover film, e.g. thickness and material of the cover film.

According to some example implementations, a plurality of classifier sets and/or databases may be stored where each set or database may be tuned to a different type of cover film, e.g. different cover film thickness. In some example implementations, during operation, the digitizer circuit may detect the cover film (or detect no cover film) and select an appropriate databases that is tuned to operation of the touch-screen with the cover film.

According to some example implementations, there is provided a plurality of methods for detecting presence of a cover film and an effective thickness of the cover film.

In one example, presence of a cover film may be detected based on capacitance levels in a map of detected mutual capacitance at junctions when no touch input is applied on the touch-sensitive screen. Optionally, an overall increase in the capacitance levels across the map as compared to a stored level detected with no cover film indicates a presence of a cover film covering the touch-screen. Optionally, effective cover film thickness is related to an extent of the increase.

In another example, presence of a cover film is detected based on a level of capacitive coupling detected between neighboring conductive lines of the grid based capacitive sensor while no touch input is being provided. Optionally, presence of a cover film increases capacitive coupling between neighboring lines. Capacitive coupling may be detected by driving one of the conductive lines with signal while detecting output on neighboring conductive lines. Presence of a cover film and effective thickness may be determined based on the level of capacitive coupling detected. Optionally, for in-cell technology that senses capacitive touch based on a grid of electrodes, a cover film is detected based on a level of capacitive coupling detected between a pair of parallel arrays of conductive electrodes while no touch input is being provided. Capacitive coupling may be detected by driving one array of the conductive electrodes with signal while detecting output on neighboring arrays of conductive electrodes. An array of the conductive electrodes may for example be driven simultaneously with a same signal.

In yet another example, a finger touch effect during a grounded mode is compared to a finger touch effect during an ungrounded mode and based on the ratio of touch effects, presence of a cover film and effective thickness may be determined. Optionally, presence of a cover film brings the ratio closer to one.

In yet other examples, when a transition between stylus hover and stylus touch is detected based on a pressure sensor in the stylus, attributes of the stylus signal as detected by the digitizer system during stylus touch provides indication of a presence of a cover film and effective thickness of the cover film. In some examples, one of gain, gradient and phase of the detected stylus signal is compared to stored values. Optionally, presence of a cover film attenuates the gain, decreases the gradient of a peak in output at a stylus touch location and shifts the phase of the stylus signal.

In some example implementations, a digitizer system may select appropriate classifiers as long as an effective thickness of the cover film is below a defined threshold and may provide an alert or alter operation when the effective thickness is above the defined threshold. Optionally, a user may be advised to remove the cover film based on the alert. Optionally, the digitizer circuit may disable support for one or more modes of operation based on identifying the effective thickness of the cover film. In one example, algorithms supporting detection of a passive stylus may be disabled based on identifying the effective thickness of the cover film. In another example, algorithms supporting detection of a gloved fingertip may be disabled. In yet other examples, capacitive touch detection may be disabled and the digitizer system may only support active stylus detection as long as the cover film is detected. In yet other examples, multi-touch detection may be disabled and only single touch detection may be activated. An active stylus as used herein is a stylus that includes an internal power source and that emits a signal that is powered by the internal power source. Optionally, capacitive touch detection may be disabled based on detecting a cover film on the touch-screen having a thickness of about 2 mm or more. In some example implementations, brightness or other illumination properties of the electronic device may be adjusted based on presence of a cover film and option thickness of the cover film to improve visualization of the electronic display. Optionally, detection of the cover film may prompt testing operation of an embedded camera and speaker in view of the cover film.

In some example embodiments, it has been found that stylus tracking accuracy is sensitive to the presence of a cover film and also to its thickness. According to some example implementation, a digitizer circuit may adjust a correction for stylus parallax or may correct for stylus parallax based on detecting a cover film on the touch-screen.

Reference is now made to FIG. 1 showing a simplified block diagram of an example computing device including a touch-screen for tracking stylus and finger input. According to some implementations, a computing device 100 includes a display screen 45 integrated with a digitizer sensor 50. Digitizer sensor 50 may be integrated with display 45 by bonding the digitizer onto a display stack, or by using out cell, on cell, or in cell digitizer technologies in which the digitizing elements shared circuits within display 45. Optionally, a user may attach a cover film 55 over the touch-screen and operate the touch-screen with cover film 55. Cover film 55 may be for example a protective cover or a privacy film as described herein above. Cover film 55 may be relatively thin, e.g. 50-100 µm, 50-200 µm or 50-300 µm or relatively thick, e.g. 300-500 µm or 400-900 µm. Cover film 55 may be made from glass or a polymer.

In some example embodiments, digitizer sensor 50 may be a grid based capacitive sensor including conductive lines 58 arranged in a grid that define junctions 56. Alternatively, sensor 50 may be replaced by a capacitive based sensor that is formed with a grid of conductive electrodes as shown in FIG. 6C. Sensor 50 may be operated to detect both input by stylus 200 and to detect a finger effect due to one or more fingertips 46 or other conductive objects interacting with sensor 50. A digitizer circuit 25 controls operation of digitizer sensor 50 and communicates with host circuit 22. Typically, digitizer circuit 25 tracks location of stylus 200 and fingertips 46 based on inputs received by digitizer sensor 50. Digitizer circuit 25 may alternate between sampling output to detect signal 26 and scanning conductive strips 58 to sense one or more fingertips 46.

Digitizer circuitry 25 may apply mutual capacitive detection or a self-capacitive detection for sensing a touch effect of fingertip 46. Typically, during mutual capacitive and self-capacitive detection, digitizer circuitry 25 generates and sends a drive signal 36 (interrogation signal or triggering signal) to one or more conductive lines 58 of digitizer sensor 50 and samples output in response to the interrogation. Bringing a grounded finger 46 (or other part of the hand) close to the surface of digitizer sensor 50 changes a local electrostatic field and reduces the mutual capacitance at junctions 59 in the touched area. Fingertip touch typically has the effect of reducing amplitude of the measured signal.

During mutual capacitive detection, output from digitizer sensor 50 may be in the form of a heatmap that maps detected amplitudes of the coupled signals at each junction. In the heatmap, fingertip touch typically produces a negative blob at the finger touch location. The change in amplitude of the measured signal due to the finger touch depends on the ground state of the system.

Digitizer circuit 25 may separately sample outputs from conductive lines 58 to detect a signal 26 emitted by stylus 200 and locally picked up by conductive lines 58 near a tip 20 of stylus 200. Stylus 200 may be pressure sensitive and may transmit information related to pressure applied on tip 20 as well as other information related to the stylus. Digitizer circuit 25 may demodulate information such as pressure transmitted by stylus 200.

In some example implementations, digitizer circuit 25 includes cover film detection and correction engine 27 that is configured to detect presence of cover film 55, detect a physical attribute of cover film 55 and alter touch detection classifiers or parameters based these detections. In some example embodiments, cover film detection and correction engine 27 includes memory capability or memory access where a first set of classifiers dedicated for classifying touch input without a cover film is stored and a second set of classifiers dedicated for classifying touch input with a cover film is also stored. Optionally, additional sets of classifiers each dedicated for classifying touch with a different type of cover film are also stored and used based on the detected physical attributes of cover film 55.

Digitizer circuitry 25 may use both analog and digital processing to process signals detected with digitizer sensor 50. Optionally, some or all of the functionalities of digitizer circuit 25 may be integrated into host 22. Optionally, some or all of the functionalities of cover film detection and correction engine 27 are integrated into host 22. Typically, output from digitizer circuitry 25 is reported to host 22. Typically, the output provided by digitizer circuitry 25 to host 22 may include coordinates of one or more fingertips 46, coordinates of writing tip 20 of stylus 200 and additional data provided by stylus 200, e.g. pressure, tilt, and battery level. Optionally, detection of cover film 55 is reported to host 22.

Figure 2A:
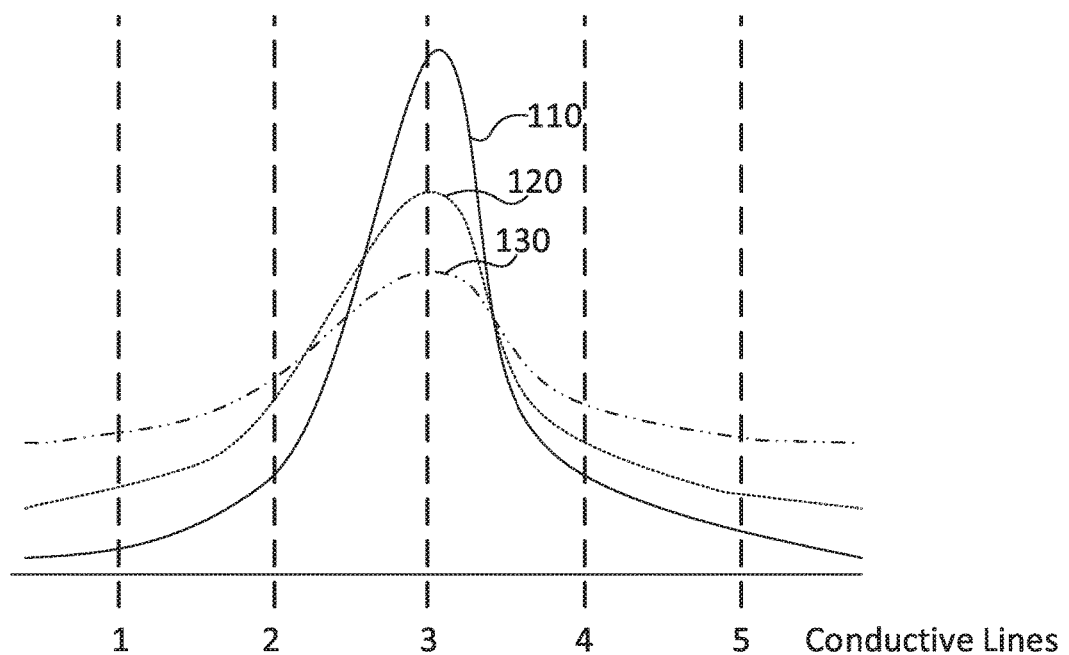
FIGS. 2A and 2B are a graph showing exemplary expected relative touch effects at self capacitance mode and corresponding bar graphs of exemplary gains detected when a fingertip is touching a touch-screen with no cover film, a relatively thin cover film and a relatively thick cover film.
Figure 2B:
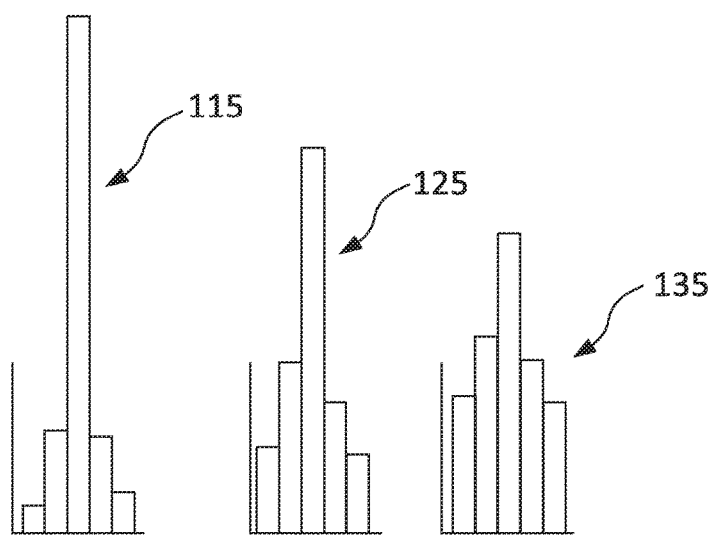
Figure 3:
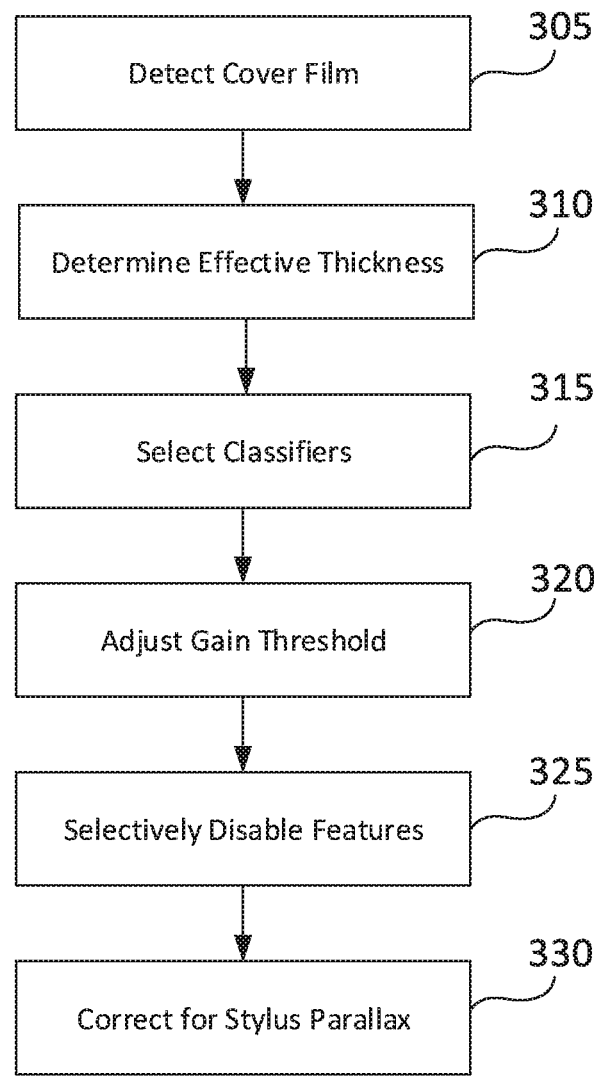
FIG. 3 is a simplified flow chart of an example method for enhancing touch detection based on detecting a cover film.

Reference is now made to FIGS. 2A and 2B showing a graph of exemplary expected relative touch effects and corresponding bar graphs of exemplary gains detected when a fingertip is touching a touch-screen with no cover film, a relatively thin cover film and a relatively thick cover film. Reference is also made to FIG. 3 showing a simplified flow chart of an example method for enhancing touch detection based on detecting a cover film. Relative touch effect curve 110 and relative gains 115 across a plurality of conductive lines represent an example expected response of a grid based capacitive digitizer system to touch of fingertip 46 when no cover film 55 is positioned over digitizer sensor 50. Curve 110 and gains 115 are an exemplary response across one axis of digitizer sensor 50 and along one conductive line that crosses conductive lines 1-5 shown in FIG. 2A. A similar response is typically detected on additional neighboring lines and also on a plurality of lines across a second axis of digitizer sensor 50.

A spread and slope of the peak in curve 110 and gains 115 are parameters that are typically constant for a particular user and also substantially constant for a large population of adults and substantially constant for a large population of children. In some example embodiments, a spread and slope of a relative touch effect tracked and applied to distinguish between different types of touches. Different types of touches may include fingertip touches, palm touches, thumb touches and ear touch.

It has been found that cover film 55 on digitizer sensor 50 increases capacitive coupling between nearby electrodes and the increase in capacitive coupling alters shape and size of the relative touch effect. Depending on a relative thickness of cover film 55, the changes in the relative touch effect that occur may significantly reduce an ability of digitizer system to distinguish between different types of touches. Exemplary changes due to an increase in the capacitive coupling include a spread of the touch signal over a larger area and a decrease in a slope toward a peak response. Gain of peak may also be diminished due to cover film 55. An example relative touch effect curve 120 and example detected relative gains 125 represent a response to a fingertip touch on a digitizer sensor covered with a relatively thin film. An example relative touch effect curve 130 and example detected relative gains 135 represent a response to a fingertip touch on a digitizer sensor covered with a relatively thick film. As can be seen, both peak and a slope of the gains are diminished based on presence of the cover film and this reduction is more pronounced when the effective thickness is larger. In some example implementations, the peak, slope and spread of a relative touch effect may be sensitive to thickness of the cover film and may also be sensitive to material of the cover film. For example, a glass cover film may diminish the peak and slope to a different extent than a polymer cover film. In a further example, the relative touch effect is also sensitive to a hardness of a polymer cover film. For example, a hard polymer cover film may diminish the peak and slope to a different extent than a soft polymer cover film.

Alteration in the shape of the relative touch effect due to a cover film may lead to errors in distinguishing between close touches, errors in differentiating between intended fingertip touches and unintended touches such as palm or a thumb holding the touch sensitive device. According to some example implementation, a digitizer system is configured to detect a cover film and adjust processing of received input based on the detection of the cover film.

According to some example implementation, a digitizer system is configured to detect a cover film on a digitizer sensor (block 305). The detection may be performed while a user is interacting with a touch sensitive device or at startup of the device. In some example embodiments, the digitizer system initiates the detection and repeats the detection on a periodic basis, e.g. once a day. Optionally, in addition to detecting the cover film, the digitizer system may also detect a relative thickness of the cover film (block 310). Detection may be based on one or more method described herein. In some example embodiments, based on the detection one or a plurality of pre-defined classifiers sets may be selected and used to differentiate between different types of touches (block 315). Optionally, in addition to altering the classifiers, a gain threshold based on which a presence of touch is identified may be adjusted to compensate for a reduction in peak gain due to the cover film (block 320). Optionally, one or more touch modes of operation may be selectively disabled based on detecting the cover film and based on a detected relative thickness of the detected cover film (block 325). In some example embodiments, stylus coordinates may also be adjusted based on detecting the cover film. For example, the coordinates may be adjusted to correct for parallax due to heightening of stylus tip touch with respect to the digitizer sensor in the presence of the cover film (block 330).

Figure 4A:
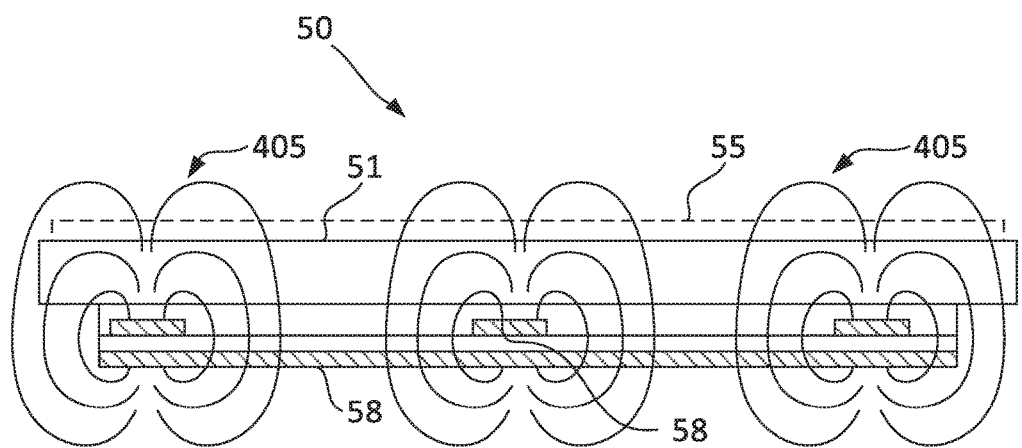
FIGS. 4A and 4B are a graphical representation of example capacitive coupling at junctions of a grid based capacitive sensor and example outputs from a heatmap obtained with no cover film, a relatively thin cover film and a relatively thick cover film.
Figure 4B:
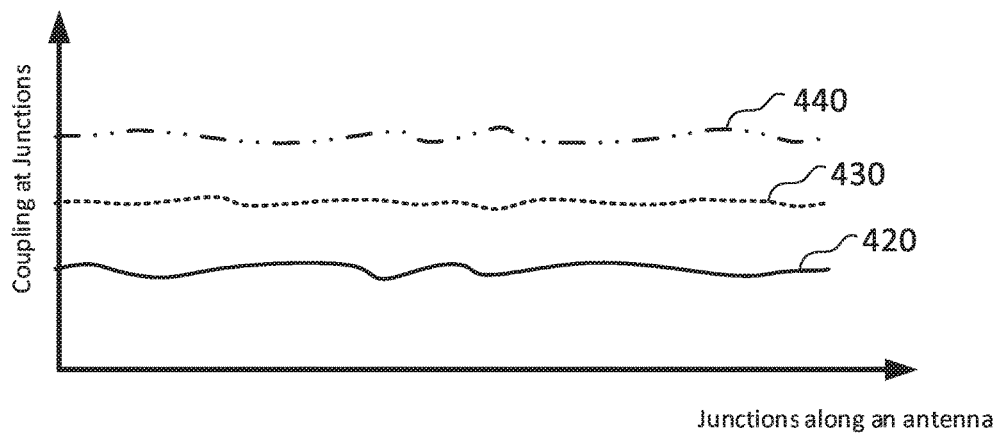
Figure 5:
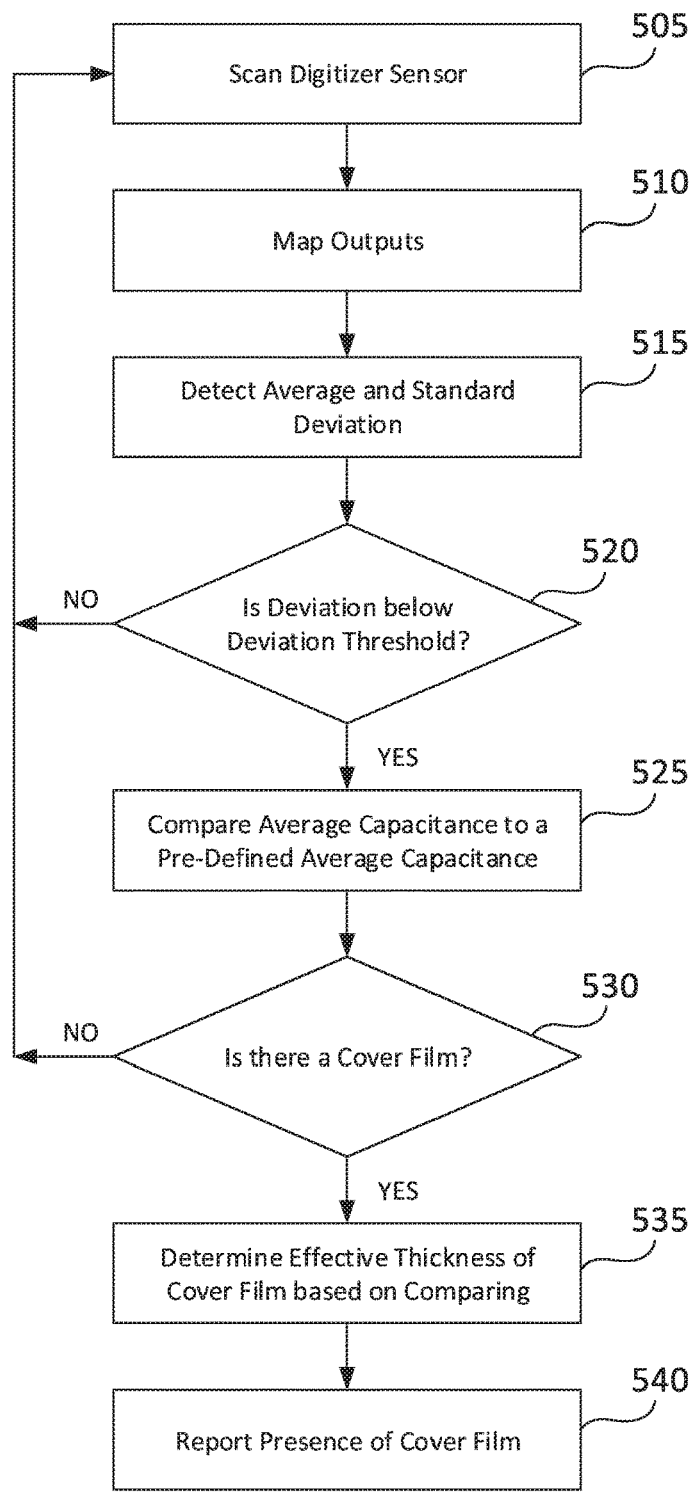
FIG. 5 is a simplified flow chart of an example method for detecting a cover film based on a heatmap.

Reference is now made to FIGS. 4A and 4B showing a graphical representation of example capacitive coupling at junctions of a grid based capacitive sensor and example outputs from a heatmap obtained with no cover film, a relatively thin cover film and a relatively thick cover film. Reference is also made to FIG. 5 showing a simplified flow chart of an example method for detecting a cover film based on a heatmap detected with no touch input. In some example implementations, the method includes scanning the digitizer sensor for mutual capacitive detection (block 505) and detecting the heatmap (block 510). It has been found that the heatmap is sensitive to a presence of a cover film and is also sensitive to its effective thickness, e.g. sensitive to a difference between a relatively thin and relatively thick cover film. For example, curve 420 is an example level of capacitance 405 at junctions along one example conductive line when no cover film is applied on the digitizer sensor and curve 430 and 440 are example levels of capacitance along a same conductive line when a thin and thick cover film respectively is placed on the digitizer sensor. The level of capacitances may be obtained from a heatmap that is detected by the digitizer system. Capacitive coupling detected at junctions increases when a cover film is placed on the digitizer sensor. The increase is sensitive to the relative thickness of the cover film such that the capacitive coupling increases with increased relative thickness.

In some example implementations, an average and standard deviation of the heat map is determined (block 515). The standard deviation may facilitate identifying if the average value represents a steady state value over the entire digitizer sensor when no touch input is provided. Since a cover film is typically uniform along its surface area and is applied over an entire touch-screen, any changes in capacitive coupling at the junctions due to the cover film are expected to be global. In some examples if the stand deviation is determined to be below a pre-defined deviation threshold, the average value may be approved for indicating presence of a cover film (block 520). In such a case, the average amplitudes is compared to a stored amplitude level associated with a known cover film or associated with no cover film (block 525). Based on the comparison, a presence of the cover film is determined (block 530). For example if the average value is significantly larger than a stored average value known to be associated with no cover film, a presence of a cover film is verified. A delta between the stored average value and the detected average value may determine effective thickness of the cover film (block 535). When a cover film is detected, it presence and its thickness may be reported (Block 540). Reporting may be to the digitizer circuit and may also be to the host. Based on the reporting, operation of the digitizer system may be adjusted to accommodate for changes in the expected signals detected with the digitizer sensor.

Figure 6A:
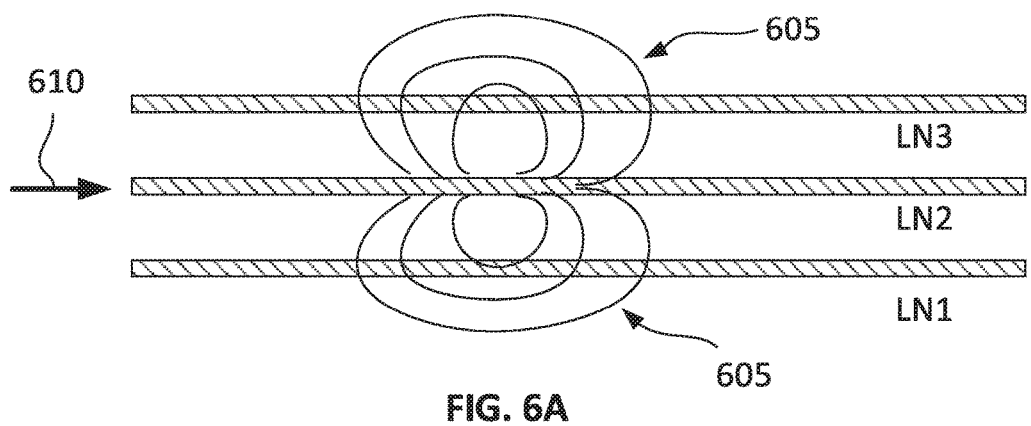
FIGS. 6A and 6B are a simplified graphic representation of example capacitive coupling between neighboring conductive lines of a grid based capacitive sensor and a simplified graph showing example capacitive coupling levels detected with no cover film, a thin cover film and a thick cover film.
Figure 6B:
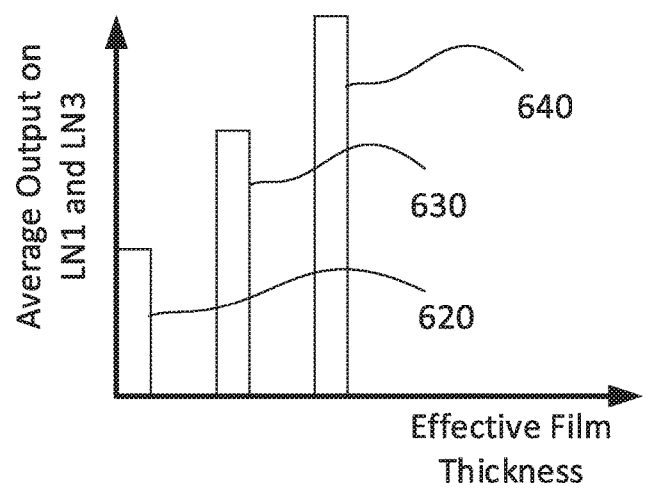
Figure 6C:
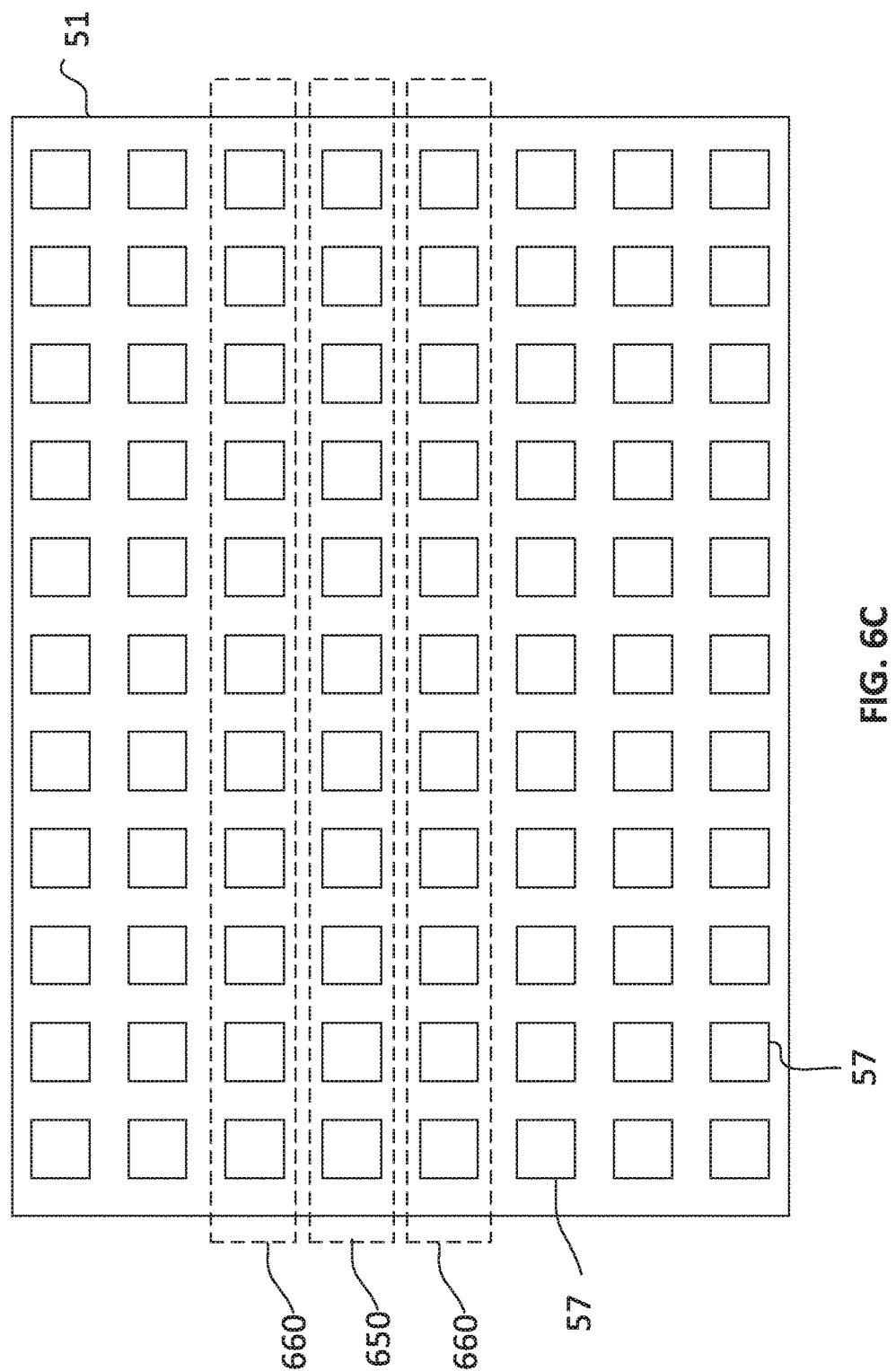
FIG. 6C is an example pattern of an in-cell sensor pattern and example grouping of sensor electrodes for detecting capacitive coupling across the sensor.
Figure 7:
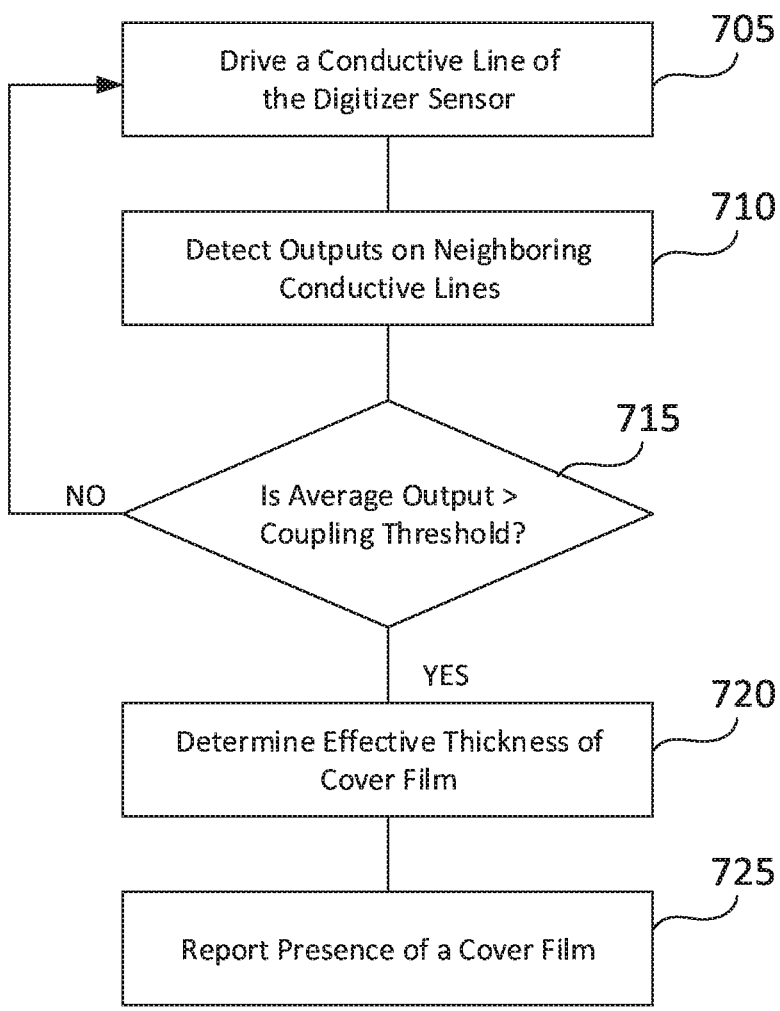
FIG. 7 is a simplified flow chart of an example method for detecting a cover film based on capacitive coupling between neighboring conductive lines.

Reference is now made to FIGS. 6A and 6B showing a simplified graphic representation of example capacitive coupling between neighboring conductive lines of a grid based capacitive sensor and a simplified graph showing example capacitive coupling levels detected with no cover film, a thin cover film and a thick cover film. Reference is also made to FIG. 7 showing a simplified flow chart of an example method for detecting a cover film based on capacitive coupling between neighboring conductive lines. In some example implementations, cover film detection and correction engine 27 is configured to detect capacitive coupling 605 between neighboring, e.g. parallel conductive lines. Capacitive coupling 605 may be significantly altered based on presence of the cover film. Capacitive coupling 605 may also be affected by touch panel stack up design, dielectric, conductive objects and user finger.

Capacitive coupling 605 may be detected by driving a conductive line of a digitizer sensor, e.g. LN2 (block 705) and in response detecting output on one or more neighboring conductive lines (block 710). Optionally, a level of coupling 605 may be determined based on average outputs detected on the neighboring lines, e.g. lines LN1 and LN3. Typically, an average output for a digitizer sensor without an added cover film, for example level 620 may be lower than the average output, for example level 630 detected when a cover film is present. The average output may increase with increased thickness. For example level 640 detected with a relatively thick cover film may be higher than level 630 detected with a relatively thin cover film. In example implementations, a detected average output is compared to a pre-defined coupling threshold associated with measurements taken with no cover film (block 715). Optionally, a detected average output may be compared to a pre-defined coupling threshold associated with detection with a cover film with known effective thickness. In some example embodiments, the detection is based on output from one neighboring antenna as opposed to an average of more than one neighboring antenna. The effective thickness may be determined based on the comparing (block 720). When a cover film is detected, its presence and its thickness may be reported (block 725). Report may be to the digitizer circuit and may also be to the host. Based on the reporting, operation of the digitizer system may be adjusted to accommodate for changes in the expected signals detected with the digitizer sensor.

Reference is now made to FIG. 6C showing an example pattern of an in-cell sensor pattern and example grouping of sensor electrodes for detecting capacitive coupling across the sensor. According to some example implementations, a similar approach may be applied when detection touch with capacitive based sensor formed from a grid of conductive pads. For example, capacitive coupling 605 may be detected by driving an array 650 of conductive electrodes 57 of a digitizer sensor 51 and in response detecting output on one or more neighboring arrays 660 of conductive electrodes pads 57. Optionally, a level of coupling 605 may be determined based on average outputs detected on an array 660 or an average between array 660 on each side of array 650. Typically, an average output for a digitizer sensor without an added cover film, for example level 620 may be lower than the average output, for example level 630 detected when a cover film is present. The average output may increase with increased thickness.

Figure 8:
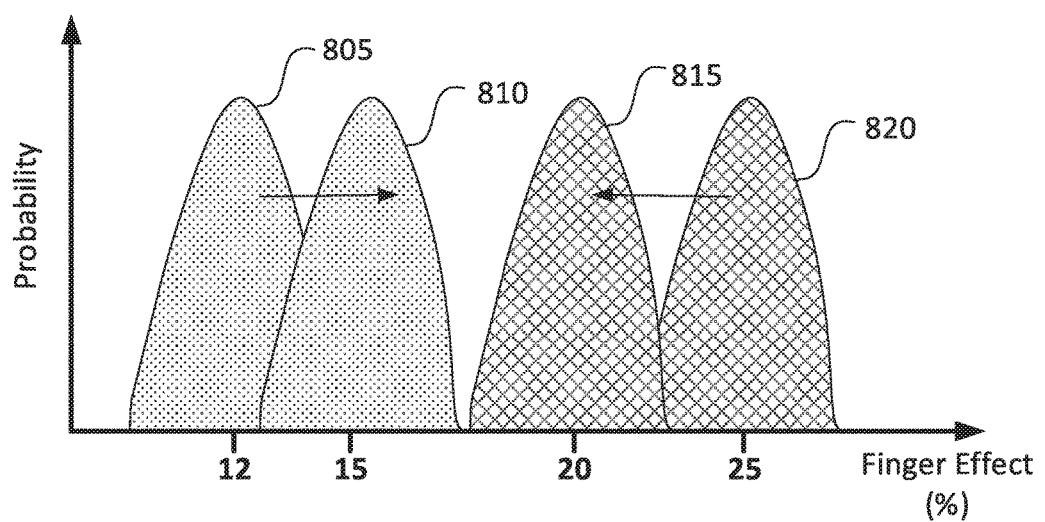
FIG. 8 is simplified graph of example expected levels of relative touch effects for grounded and ungrounded touches without a cover film on the touch-screen and with a cover film on the touch-screen.
Figure 9:
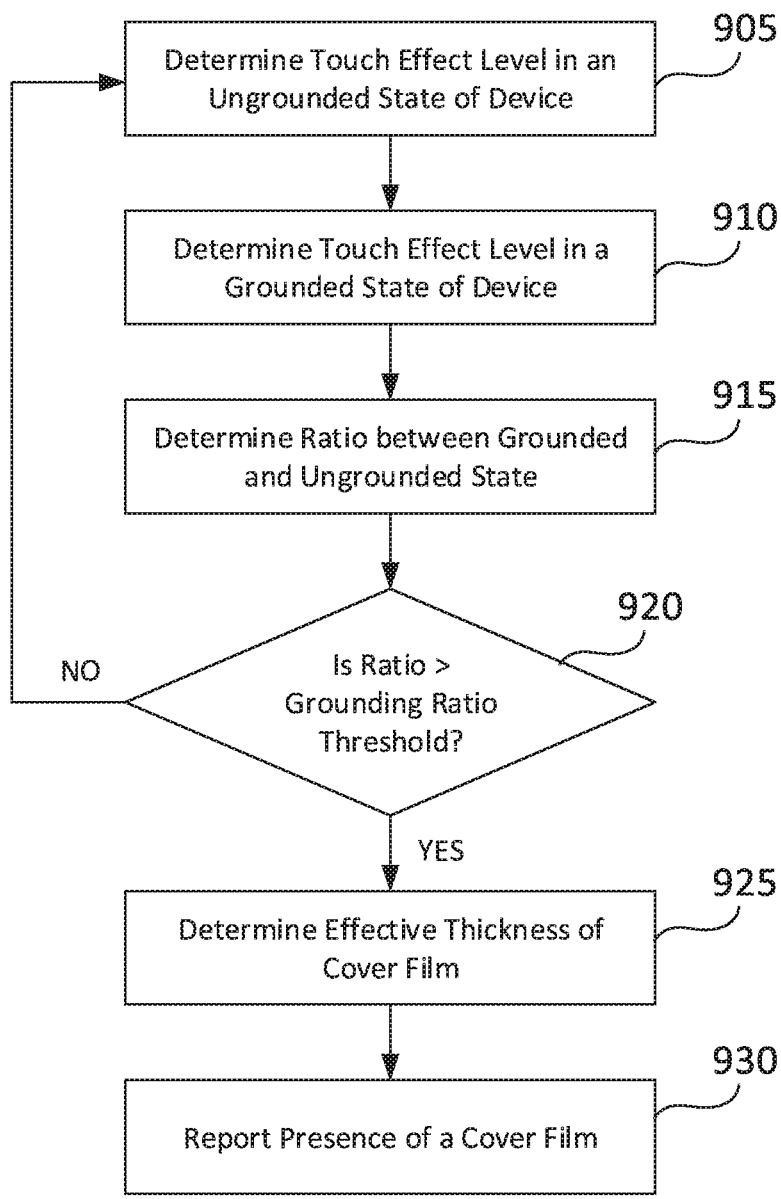
FIG. 9 is a simplified flow chart of an example method for detecting a cover film on a touch-screen based on detected grounded and ungrounded touch signals.

Reference is now made to FIG. 8 showing simplified graph of example expected levels of relative touch effects for grounded and ungrounded touches without a cover film and with a cover film on the touch-screen. Reference is also made to FIG. 9 showing a simplified flow chart of an example method for detecting a cover film on a touch-screen based on detected grounded and ungrounded touch signals. Methods for determining when a touch sensitive computing device is grounded or ungrounded are known. When operating a touch-screen without a cover film, a touch effect 820 detected while a device is grounded may be expected to be around 25% and a touch effect 805 while a device is ungrounded may be expected to be around 12%. According to some example implementations, when a cover film is positioned over the touch sensing surface, the touch effects change. It has been found that adding a cover film tends to reduce a delta between grounded and ungrounded values. For example, touch effects 815 around 20% may represent touch effects that are detected in an ungrounded state when a touch screen is covered with a cover film and touch effects 810 around 15% may represent touch effects that are detected in a grounded state when a touch screen is covered with a cover film.

In some example implementations, during user interaction, relative touch effects of a single finger is recorded over a plurality of touch events including touch in an ungrounded state (block 905) and touch in a grounded state (block 910) of the touch sensitive device. A ratio of average touch effects in ungrounded states over average touch effects in grounded states may be determined (block 915). The detected ratio may be compared to a pre-defined grounding ratio threshold (block 920). If the ratio is above the pre-defined grounding ratio threshold, a presence of a cover film may be verified. Based on a delta between the ratio detected and the stored pre-defined grounding ratio threshold, an effective thickness of the cover film may also be determined (block 925). When a cover film is detected, it presence and its thickness may be reported (block 930). Report may be to the digitizer circuit and may also be to the host. Based on the reporting, operation of the digitizer system may be adjusted to accommodate for changes in the expected signals detected with the digitizer sensor.

Figure 11:
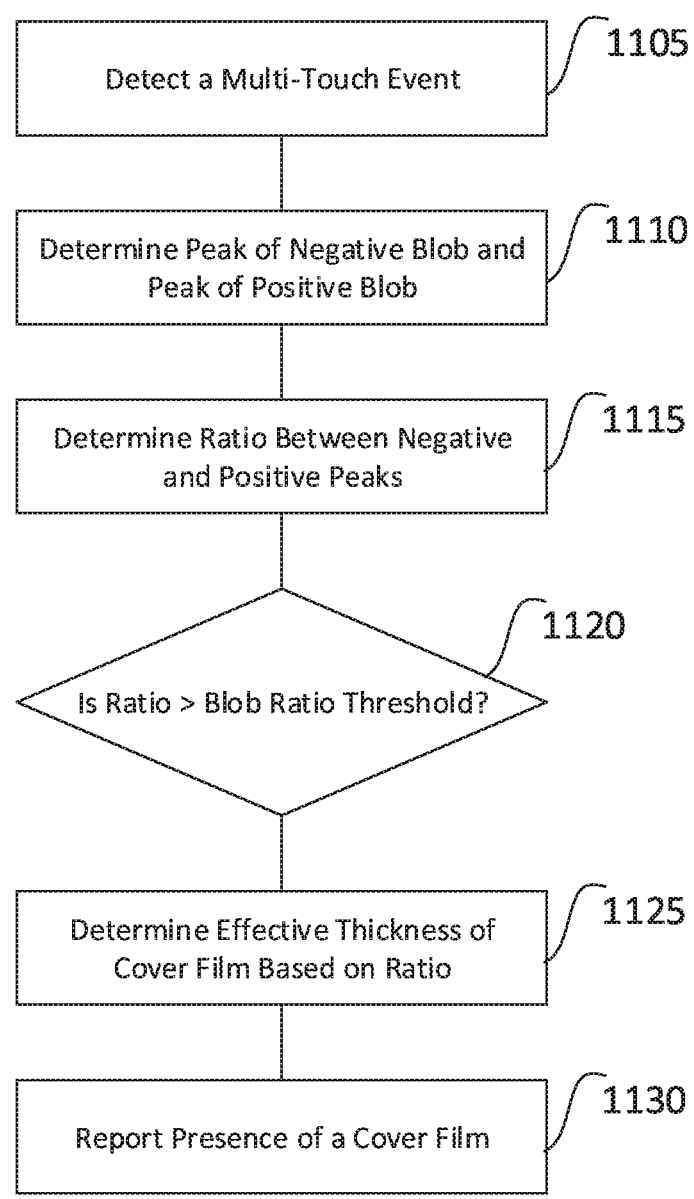
FIG. 11 is a simplified flow chart of an example method for detecting a cover film on a touch-screen based on detected positive and negative blobs.

Reference is now made to FIGS. 10A and 10B showing a graphical representation of multi-touch with ghosting and exemplary amplitudes from a corresponding heatmap. Reference is also made to FIG. 11 showing a simplified flow chart of an example method for detecting a cover film on a touch-screen based on detected positive and negative blobs. During multi-touch interaction, a negative blob 551 may be detected at a location along conductive line 581 with touch interaction 510 and positive blob 550 may be detected at a ghost location 520 along conductive line 581 that occurs due to two touch locations 510. The positive and negative blobs are detected on a heat map. Exemplary output along only one conductive line 581 is shown in FIG. 10B for simplicity purposes. It has been found that while an addition of a cover film reduces amplitude of both the positive and the negative blob, the change in peak amplitude is more pronounced in the positive blob. For example a peak in positive blob 555 and negative blob 556 detected with a cover film positioned over a touch screen is less than peak in positive blob 550 and negative blob 551 detected with no cover film. However, the change in peak between positive blob 550 and 551 is more pronounced as compared to the change in peak between negative blob 551 and 556. In some example implementations, a cover film may be detected based on a ratio between a positive and negative blob in a multi-touch event.

According to some implantations, when a multi-touch event (block 1105) is identified, peak values for a corresponding negative and positive blob are determined (block 1110) and a ratio between the negative and positive peak is calculated (block 1115). The ratio may be compared to a pre-defined blob ratio (block 1120). When the ratio calculated is larger than the pre-defined blob ratio a presence of a cover film may be determined. An effective thickness of the cover film may be detected based on a delta between the calculated ratio and the pre-defined blob ratio (block 1125). When a cover film is detected, its presence and its thickness may be reported (block 930). Report may be to the digitizer circuit and may also be to the host. Based on the reporting, operation of the digitizer system may be adjusted to accommodate for changes in the expected signals detected with the digitizer sensor.

Figure 12A:
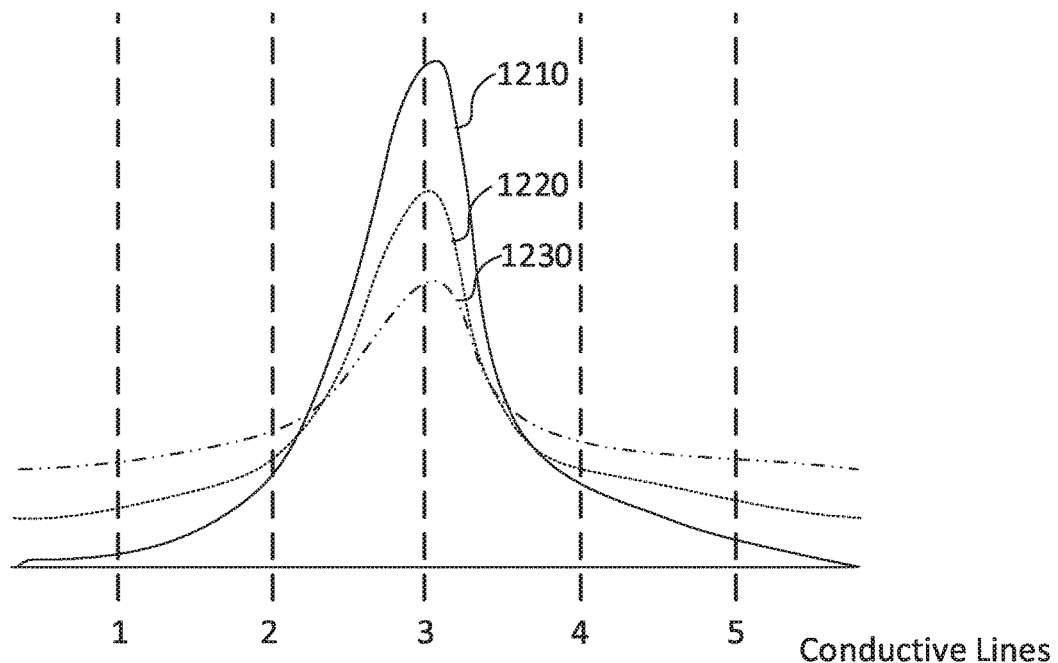
FIG. 12A and FIG. 12B are a graph showing exemplary expected stylus signals and corresponding bar graphs of exemplary gains detected when the stylus is touching a touch-screen with no cover film, a relatively thin cover film and a relatively thick cover film.
Figure 12B:
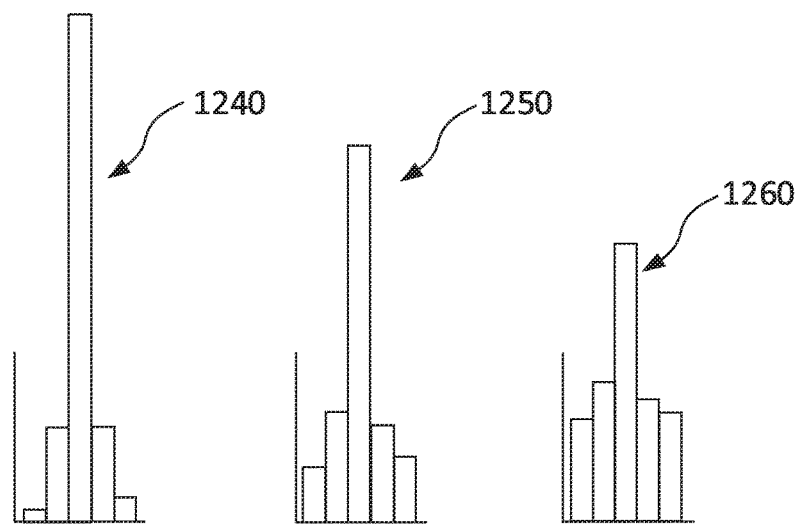
Figure 13:
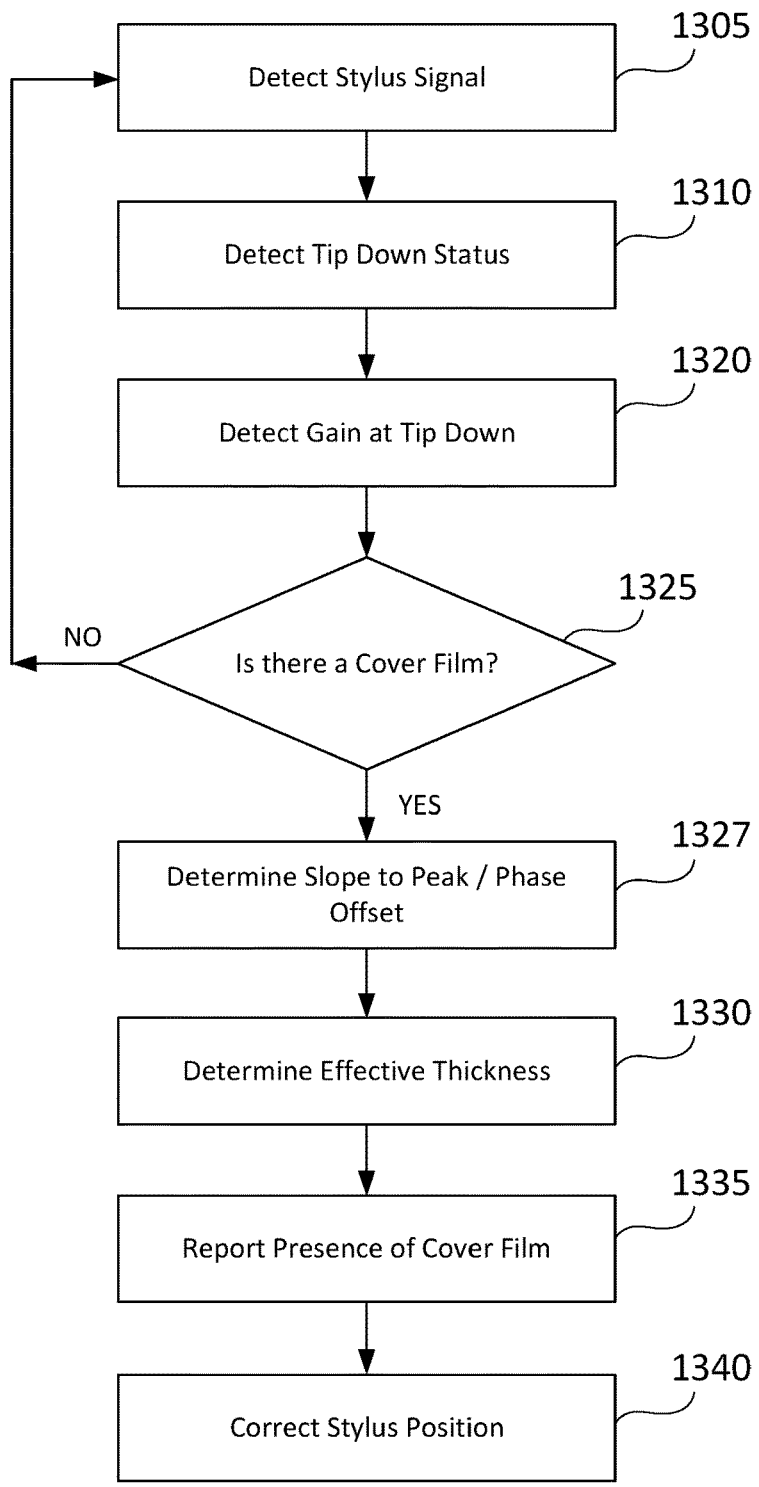
FIG. 13 is a simplified flow chart of an example method for enhancing fingertip and stylus touch detection based on detecting a cover film.

Reference is now made to FIG. 12A and FIG. 12B showing a graph showing exemplary expected stylus signals and corresponding bar graphs of exemplary gains detected when the stylus is touching a touch-screen with no cover film, a relatively thin cover film and a relatively thick cover film. Reference is also made to FIG. 13 showing a simplified flow chart of an example method for enhancing fingertip and stylus touch detection based on detecting when a cover film is added on the digitizer sensor. In some example implementations, a cover film on a digitizer sensor may be identified based on gain of stylus signal at a tip down state of a stylus. Since a cover film distances the stylus tip from a surface of the digitizer sensor, a gain of the detected signal will be diminished. For example stylus signal 1210 detected with no cover film will have a higher gain 1240 as compared to gain 1250 of stylus signal 1220 detected with a thin cover film. Furthermore stylus signal 1230 detected with a thick cover film will have a lower gain 1260 than gain 150 stylus signal 1220 detected with a thin cover film. In some example implementations, an effective thickness of the cover film may be determined based on the gain of the stylus signal as well as slope to peak of the stylus signal and phase shift. Optionally, slope to peak of the stylus signal may decrease and phase shift of the stylus signal may increase as a function of effective thickness of a cover film.

In some example embodiments, a stylus signal is detected (block 1305) and a tip down status is determined (block 1310). A gain of the stylus signal may be detected and compared to a pre-defined stylus touch threshold corresponding to a level detected with no cover film (block 1320).

Optionally, phase of the detected output may also be detected and compared to a pre-defined value. If a cover film is detected (block 1325), the gain and phase may be inspected (block 1327) to determine effective thickness of the cover film (block 1330). When a cover film is detected, it presence and its thickness may be reported (block 1335). Report may be to the digitizer circuit and may also be to the host. Based on the reporting, operation of the digitizer system may be adjusted to accommodate for changes in the expected signals detected with the digitizer sensor. In some example implementations, stylus position may be corrected based on detected a cover film (block 1340). Typically, the correction is due to a parallax error.

Figure 14:
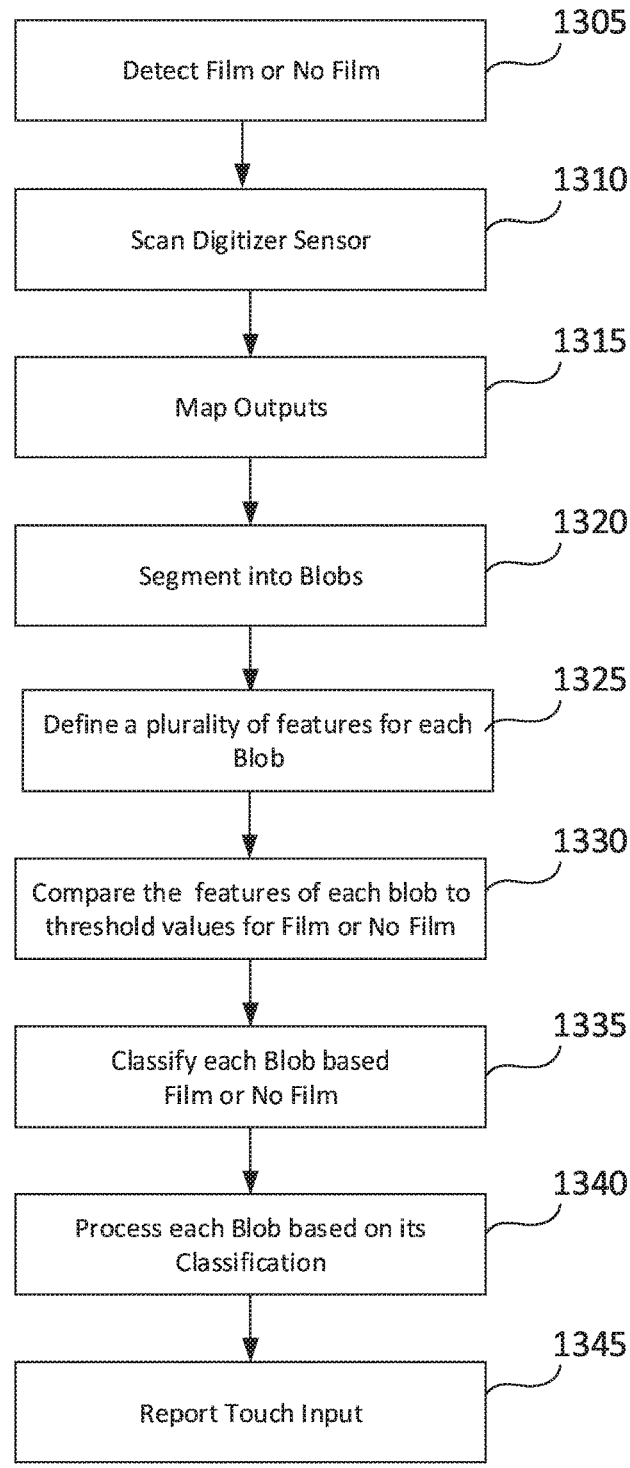
FIG. 14 is a simplified flow chart of an example method for using information related to cover film detection.

Reference is now made to FIG. 14 showing a simplified flow chart of an example method for classifying touch. According to implementation of the present disclosure, a digitizer system is configured to detect a presence of a cover film over an original sensing surface of the digitizer system during operation of touch screen as described herein (block 1305). Optionally, thickness of the film is also detected. Indication that a cover film has been added and optionally a thickness of the cover film may be stored in memory. During operation of the touch-screen, the grid based capacitive sensor is scanned (block 1310) and amplitudes of detected outputs at junctions of the sensor mapped in a two-dimensional map (block 1315). The map may segmented to discrete regions of touch input (blobs) (block 1320). Features of each blob may be quantified based on defined parameters (block 1325). Example features include size, shape, orientation and slope of the amplitudes toward a peak.

The parameters may be compared to corresponding threshold values that are stored in memory (block 330). According to some implementations of the present disclosure, a plurality of sets of threshold values are stored in memory, including a first set configured to classify touch for a touch screen with no cover film and second set configured to classify touch for a touch-screen with a cover film. Optionally, additional sets are configured to classify touch with a cover film with a defined range of thicknesses.

According to some implementations of the present disclosure, when a cover film is detected, features of each blob are compared to threshold values from the set defined for no cover film and when a cover film is detected, the features of each blob is compared to threshold values from the set defined for no cover film (block 1335). Classification for each blob may be selected for example from a group including, single fingertip touch, clumped fingertip touch, thumb touch and palm touch.

Blobs may be processed based on their classification (block 1340). For example, a blob classified as clumped fingertip touch may be further processed to separate the finger touches and provide a coordinate location for each finger touch in the clump. Touch input may be reported or not reported based on the processing (block 1340).

According to some aspects of the present disclosure there is provided method comprising: storing a first set of classifier data and a second set of classifier data, the first set being different from the second set, wherein each of the first set and the second set is configured to differentiate between different types of touches on a touch sensitive screen including a capacitive based sensor, and wherein the first set is adapted to differentiate between different types of touches on a touch sensitive screen with no cover film added on the screen and the second set is adapted to differentiate between different types of touches when a cover film is added to the screen; identifying the cover film on the screen based on output from at least one conductive line or at least one array of conductive electrodes of the capacitive based sensor; selecting the second set of classifier data based on the identifying; and reporting a touch interaction based on the second set of classifier data.

Optionally, the method includes detecting an effective thickness of the cover film based on output from the at least one conductive line of the capacitive based sensor, wherein the effective thickness is actual thickness of the cover film or another parameter that represents a level of degradation of the touch signal due to overall physical properties of the cover film.

Optionally, the identifying is based on a detected increase in a level of mutual capacitive coupling at one or more junctions the sensor with no touch input.

Optionally, the identifying is based on a detected increase in capacitive coupling between parallel conductive lines of the sensor or parallel arrays of conductive electrodes of the sensor.

Optionally, the identifying is based on a detecting an increase in a ratio between a relative touch effect obtained while the touch sensitive screen is in an ungrounded state and while the touch sensitive screen is in a grounded state.

Optionally, the identifying is based on a detecting an increase in a ratio between a relative touch effect of a negative blob and a relative touch effect of a related positive blob.

Optionally, the identifying is based on detecting a decrease in amplitude of a stylus signal at a tip down state.

Optionally, the identifying is based on detecting a phase shift of a stylus signal at a tip down state.

Optionally, the method includes correcting a parallax error based on detecting the cover film.

Optionally, the method includes selectively disabling at least one of passive stylus detection, fingertip detection with a glove, multi-touch detection based on detecting the cover film.

Optionally, the classifier data is configured to classify input based on at least one of shape, size, orientation of a touch imprint and slope of a peak due to touch.

According to some aspects of the present disclosure there is provided a computing device comprising: an electronic display; a capacitive based sensor, wherein the sensor is integrated with the display; digitizer circuit, wherein the circuit is in electrical communication with the sensor and is configured to operate the sensor; a cover film detection and correction engine, wherein the engine is configured to detect a cover film placed on the display and to compensate of changes in output from the sensor based on the presence of the cover film; and a central processor, wherein the central processing unit is configured to control the electronic display based on user input obtained from the digitizer circuit; wherein one of the circuit, engine and processor is configured to: store a first set of classifier data and a second set of classifier data, the first set being different from the second set, wherein each of the first set and the second set is configured to differentiate between different types of touches on a touch sensitive screen and wherein the first set is adapted to differentiate between different types of touches on a touch sensitive screen with no cover film added on the screen and the second set is adapted to differentiate between different types of touches when a cover film is added to the screen; identify the cover film on the screen based on output from at least one conductive line or at least one array of conductive electrodes of the capacitive based sensor; select the second set of classifier data based on the identifying; and report a touch interaction based on the second set of classifier data.

Optionally, one of the circuit, engine and processor is configured to an effective thickness of the cover film based on output from the at least one conductive line or at least one array of conductive electrodes of the capacitive based sensor, wherein the effective thickness is actual thickness of the cover film or another parameter that represents a level of degradation of the touch signal due to overall physical properties of the cover film.

Optionally, the identifying is based on a detected increase in a level of mutual capacitive coupling at one or more junctions the sensor with no touch input.

Optionally, the identifying is based on a detected increase in capacitive coupling between parallel conductive lines of the sensor or parallel arrays of conductive electrodes.

Optionally, identifying the cover film is based on detecting a decrease in amplitude of a stylus signal at a tip down state.

Optionally, identifying the cover film is based on detecting a phase shift of a stylus signal at a tip down state.

Optionally, one of the circuit, engine and processor is configured to correct a parallax error based on detecting the cover film.

Optionally, one of the circuit, engine and processor is configured to selectively disabling at least one of passive stylus detection, fingertip detection with a glove, multi-touch detection based on detecting the cover film.

Optionally, the classifier data is defined to classify input based on at least one of shape, size, orientation of a touch imprint and slope of a peak due to touch.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A method comprising: storing a first set of classifier data and a second set of classifier data, the first set being different from the second set, wherein each of the first set and the second set is configured to differentiate between different types of touches on a touch sensitive screen including a capacitive based sensor, and wherein the first set is adapted to differentiate between different types of touches on the touch sensitive screen with no cover film added on the screen and the second set is adapted to differentiate between different types of touches when a cover film is added to the screen; identifying the cover film on the screen based on output from at least one conductive line or at least one array of conductive electrodes of the capacitive based sensor; detecting an effective thickness of the cover film based on output from the at least one conductive line or the at least one array of conductive electrodes of the capacitive based sensor, wherein the effective thickness is actual thickness of the cover film or another parameter that represents a level of degradation of the touch signal due to overall physical properties of the cover film; selecting the second set of classifier data based on the identifying; and reporting a touch interaction based on the second set of classifier data.

2. The method according to claim 1, wherein the identifying is based on a detected increase in a level of mutual capacitive coupling at one or more junctions of the sensor with no touch input.

3. The method according to claim 1, wherein the identifying is based on a detected increase in capacitive coupling between parallel conductive lines of the sensor or parallel arrays of conductive electrodes of the sensor.

4. The method according to claim 1, wherein the identifying is based on a detecting an increase in a ratio between a relative touch effect of a negative blob and a relative touch effect of a related positive blob.

5. The method according to claim 1, wherein the identifying is based on detecting a decrease in amplitude of a stylus signal at a tip down state.

6. The method according to claim 1, wherein the identifying is based on detecting a phase shift of a stylus signal at a tip down state.

7. The method according to claim 1, comprising correcting a parallax error based on detecting the cover film.

8. The method according to claim 1, comprising selectively disabling at least one of passive stylus detection, fingertip detection with a glove, multi-touch detection based on detecting the cover film.

9. The method according to claim 1, wherein the classifier data is configured to classify input based on at least one of shape, size, orientation of a touch imprint and slope of a peak due to touch.

10. A computing device comprising: an electronic display; a capacitive based sensor, wherein the sensor is integrated with the display; a digitizer circuit, wherein the circuit is in electrical communication with the sensor and is configured to operate the sensor; a cover film detection and correction engine, wherein the engine is configured to detect a cover film placed on the display and to compensate of changes in output from the sensor based on a presence of the cover film; and a central processing unit, wherein the central processing unit is configured to control the electronic display based on user input obtained from the digitizer circuit; wherein one of the circuit, engine and processor is configured to: store a first set of classifier data and a second set of classifier data, the first set being different from the second set, wherein each of the first set and the second set is configured to differentiate between different types of touches on a touch sensitive screen and wherein the first set is adapted to differentiate between different types of touches on the touch sensitive screen with no cover film added on the screen and the second set is adapted to differentiate between different types of touches when a cover film is added to the screen; identify the cover film on the screen based on output from at least one conductive line or at least one array of conductive electrodes of the capacitive based sensor; select the second set of classifier data based on the identifying; and report a touch interaction based on the second set of classifier data.

11. The device according to claim 10, wherein one of the circuit, engine and processor is configured to an effective thickness of the cover film based on output from the at least one conductive line or at least one array of conductive electrodes of the capacitive based sensor, wherein the effective thickness is actual thickness of the cover film or another parameter that represents a level of degradation of the touch signal due to overall physical properties of the cover film.

12. The device according to claim 10, wherein the identifying is based on a detected increase in a level of mutual capacitive coupling at one or more junctions the sensor with no touch input.

13. The device according to claim 10, wherein the identifying is based on a detected increase in capacitive coupling between parallel conductive lines of the sensor or parallel array of conductive electrodes of the sensor.

14. The device according to claim 10, wherein identifying the cover film is based on detecting a decrease in amplitude of a stylus signal at a tip down state.

15. The device according to claim 10, wherein identifying the cover film is based on detecting a phase shift of a stylus signal at a tip down state.

16. The device according to claim 10, wherein one of the circuit, engine and processor is configured to correct a parallax error based on detecting the cover film.

17. The device according to claim 10, wherein one of the circuit, engine and processor is configured to selectively disabling at least one of passive stylus detection, fingertip detection with a glove, multi-touch detection based on detecting the cover film.

18. The device according to claim 10, wherein the classifier data is defined to classify input based on at least one of shape, size, orientation of a touch imprint and slope of a peak due to touch.

19. A method comprising:
storing a first set of classifier data and a second set of classifier data, the first set being different from the second set, wherein each of the first set and the second set is configured to differentiate between different types of touches on a touch sensitive screen including a capacitive based sensor, and wherein the first set is adapted to differentiate between different types of touches on a touch sensitive screen with no cover film added on the screen and the second set is adapted to differentiate between different types of touches when a cover film is added to the screen;
identifying the cover film on the screen based on output from at least one conductive line or at least one array of conductive electrodes of the capacitive based sensor, wherein the identifying is based on a detecting an increase in a ratio between a relative touch effect obtained while the touch sensitive screen is in an ungrounded state and while the touch sensitive screen is in a grounded state;
selecting the second set of classifier data based on the identifying; and
reporting a touch interaction based on the second set of classifier data.

\* \* \* \* \*